United States Patent
Day

(10) Patent No.: US 10,463,152 B1
(45) Date of Patent: Nov. 5, 2019

(54) MULTI-POSITION EASEL

(71) Applicant: Marc S. Day, Castle Rock, CO (US)

(72) Inventor: Marc S. Day, Castle Rock, CO (US)

( * ) Notice: Subject to any disclaimer, the term of this patent is extended or adjusted under 35 U.S.C. 154(b) by 0 days.

(21) Appl. No.: 16/160,571

(22) Filed: Oct. 15, 2018

(51) Int. Cl.
| | |
|---|---|
| *A47B 97/04* | (2006.01) |
| *F16M 11/42* | (2006.01) |
| *B60B 33/04* | (2006.01) |
| *F16M 11/14* | (2006.01) |
| *A47B 27/02* | (2006.01) |
| *A47B 27/18* | (2006.01) |
| *F16M 11/04* | (2006.01) |
| *A47B 9/20* | (2006.01) |

(52) U.S. Cl.
CPC ............... *A47B 97/04* (2013.01); *A47B 9/20* (2013.01); *A47B 27/02* (2013.01); *A47B 27/18* (2013.01); *B60B 33/04* (2013.01); *F16M 11/046* (2013.01); *F16M 11/14* (2013.01); *F16M 11/42* (2013.01)

(58) Field of Classification Search
CPC ......... A47B 97/04; A47B 27/02; B60B 33/04; F16M 11/046; F16M 11/14; F16M 11/42
USPC .................................. 108/177, 189, 49, 6, 4
See application file for complete search history.

(56) References Cited

U.S. PATENT DOCUMENTS

| | | | | |
|---|---|---|---|---|
| 1,128,324 A | | 2/1915 | Jones | |
| 1,653,657 A | * | 12/1927 | Pretsch | A47B 23/046 |
| | | | | 108/141 |
| 1,894,991 A | * | 1/1933 | Hayes | A47B 23/02 |
| | | | | 108/8 |
| 2,709,818 A | * | 6/1955 | Freese | A47B 23/02 |
| | | | | 5/507.1 |
| 2,912,203 A | * | 11/1959 | Townsend | A47B 97/04 |
| | | | | 248/448 |
| 3,095,834 A | * | 7/1963 | Killen | A47B 85/06 |
| | | | | 108/15 |
| 3,104,762 A | | 9/1963 | Lahive | |
| 3,416,764 A | | 12/1968 | Bier | |
| 3,738,606 A | | 6/1973 | Millen | |
| 392,639 A | | 12/1975 | Vincent | |

(Continued)

FOREIGN PATENT DOCUMENTS

| | | |
|---|---|---|
| EP | 0461091 | 4/2018 |
| FR | 2942994 | 9/2010 |

OTHER PUBLICATIONS

Windmilleasel—Revolving Easel—Creative Tool for Artists, 2007, Retrieved on Apr. 26, 2018 From <https://www.windmilleasel.com/>.

*Primary Examiner* — Jose V Chen
(74) *Attorney, Agent, or Firm* — Stanley J. Gradisar Attorney At Law, LLC; Stanley J. Gradisar

(57) ABSTRACT

A multi-positional easel allows for a wider range of motion for a work platform, accommodating both seated and standing positions, as well as full tilt and rotation of the work platform. The characteristics of this easel consist of a work platform that can expand to hold various sizes of canvas or other work pieces. These work pieces are held in place by four adjustable points, two on each side. A free standing three-point wheeled base has a single adjustable vertical post. Attached to that post is a multi-positional armature assembly that allows for more flexibility in the positioning of the work platform. Once the work piece is held in place on the work platform, the work platform can be rotated in a plane in a full 360-degrees, as well as a free range of motion of tilt from a horizontal plane to a vertical plane.

15 Claims, 5 Drawing Sheets

(56) References Cited

U.S. PATENT DOCUMENTS

| | | | | |
|---|---|---|---|---|
| 4,165,856 A * | 8/1979 | Wiseheart | | A47B 97/04 |
| | | | | 248/161 |
| 4,482,185 A | 11/1984 | Zoellner | | |
| 4,717,109 A | 1/1988 | Johnston | | |
| 5,074,513 A | 12/1991 | Presley | | |
| 5,144,898 A * | 9/1992 | Posly | | A47B 23/046 |
| | | | | 108/148 |
| 5,242,145 A | 9/1993 | Linnell | | |
| 5,308,035 A | 5/1994 | Ross | | |
| 5,725,192 A | 3/1998 | Cloninger | | |
| 5,944,896 A * | 8/1999 | Landesman | | B05B 13/0285 |
| | | | | 118/500 |
| 5,979,856 A * | 11/1999 | Hsu | | A47B 19/002 |
| | | | | 248/441.1 |
| 6,390,433 B1 | 5/2002 | Kasa-Djukic | | |
| 6,604,720 B1 * | 8/2003 | Wilson | | A47B 23/04 |
| | | | | 248/177.1 |
| 6,748,873 B2 * | 6/2004 | Brown, Sr. | | A47B 3/10 |
| | | | | 108/49 |
| 6,889,952 B2 | 5/2005 | Cook et al. | | |
| 7,159,829 B1 * | 1/2007 | Finkelstein | | B60B 33/04 |
| | | | | 108/144.11 |
| 7,380,765 B2 | 6/2008 | Shiff | | |
| 8,365,739 B1 * | 2/2013 | Jones | | A47C 16/02 |
| | | | | 108/106 |
| 8,950,344 B2 * | 2/2015 | Lewis | | A61G 13/101 |
| | | | | 108/179 |
| 9,220,343 B2 | 12/2015 | Selwa | | |
| 9,833,073 B2 | 12/2017 | Selwa | | |
| 10,123,619 B2 * | 11/2018 | Kennedy | | F16B 2/065 |
| 2002/0066837 A1 * | 6/2002 | Dunbar | | A47B 19/002 |
| | | | | 248/122.1 |
| 2002/0092725 A1 * | 7/2002 | Brown | | A47B 3/10 |
| | | | | 190/11 |
| 2010/0041519 A1 * | 2/2010 | Law | | A63B 71/023 |
| | | | | 482/27 |
| 2014/0284444 A1 | 9/2014 | Young et al. | | |
| 2015/0374117 A1 * | 12/2015 | Lozano | | A47B 19/06 |
| | | | | 320/107 |
| 2016/0120303 A1 * | 5/2016 | Constantino | | F16M 11/42 |
| | | | | 108/28 |
| 2019/0092095 A1 * | 3/2019 | Plate | | B60B 33/04 |

\* cited by examiner

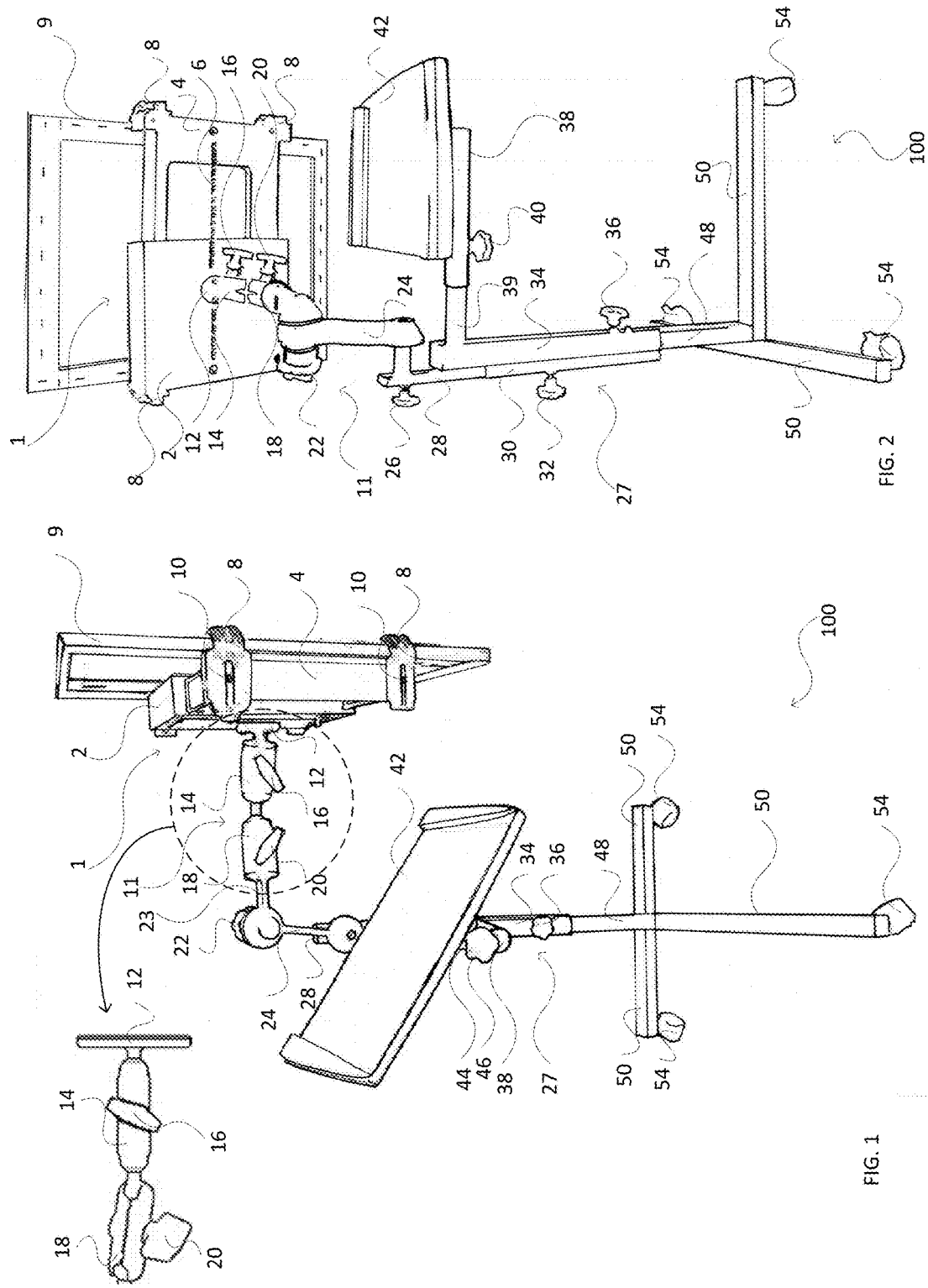

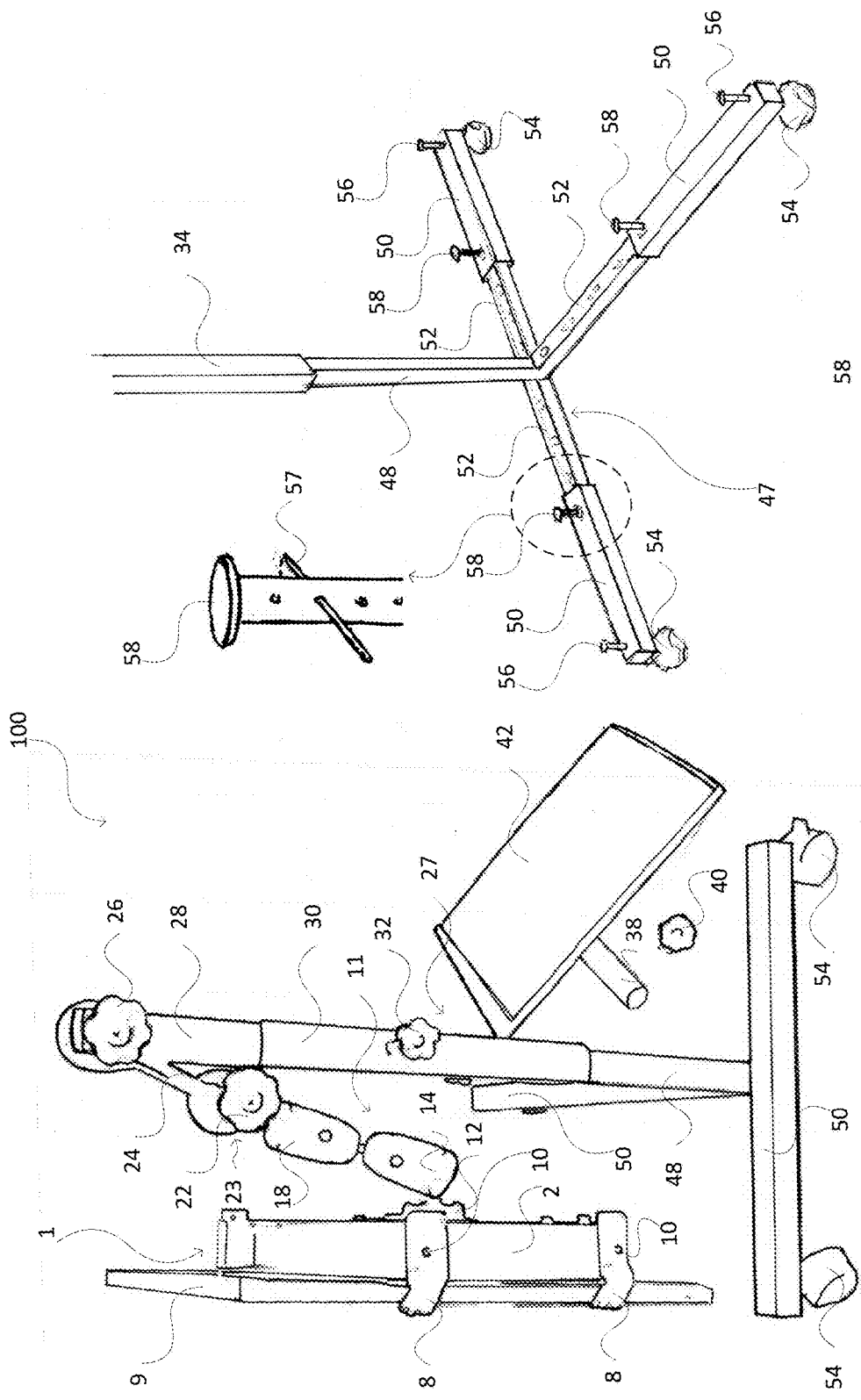

MULTI-POSITION EASEL

FIELD OF THE INVENTION

The present invention relates generally to an artist's easel, and more particularly to an easel whose design allows for 360-degrees in vertical rotation, as well as the ability to manipulate various degrees of horizontal positions. This easel is built on a free standing three-point wheeled base with a single adjustable vertical post.

BACKGROUND OF THE INVENTION

Numerous artist's easels have been disclosed in the prior art search with various adjustments thereof. While there are numerous prior art easels with a variety of available adjustment options, there is still a need for an easel which allows for the rotation of the work piece in a 360-degree vertical motion, along with the ability to adjust the horizontal positions. This easel is also adjustable up and down to accommodate artwork in the seated or standing positions, and tilt forward and backward, as well as collapse down for easy storage.

SUMMARY OF THE INVENTION

This Summary is provided to introduce in a simplified form a selection of concepts that are further described below in the Detailed Description. This Summary is not intended to identify key or essential features of the claimed subject matter, nor is it intended to be used to limit the scope of the claimed subject matter.

This easel design allows for a wider range of motion for the work platform itself, accommodating both seated and standing positions, as well as full tilt and rotation of the work platform. The characteristics of this easel consist of a work platform that can expand to hold various sizes of canvas or other work pieces. These work pieces will be held in place by four adjustable points, two on each side.

This design is intended for a multi-positional orientation for ease and comfort for the artist. The invention consists of a free standing three-point wheeled base with a single adjustable vertical post. Attached to that post is a multi-positional armature that allows for more flexibility in the positioning of the work platform. Once the work piece is held in on the work platform, the platform can be rotated in a plane in a full 360-degrees, as well as a free range of motion of tilt from a horizontal plane to a vertical plane.

BRIEF DESCRIPTION OF THE DRAWINGS

FIG. 1 shows a left-side perspective view of the multi-position easel, illustrating the various components that allow for the flexibility to the user.

FIG. 2 shows a back-side perspective view of the multi-position easel. This view shows the various components for its flexibility.

FIG. 5 shows a right-side perspective view of the multi-positional easel with the utility tray removed.

FIG. 6 shows the T-base only, showing the expansion of the three horizontal legs, with the ability to choose how much to expand for stability. This figure shows locking pins for the leg expansion, as well as adjusting the wheel height.

Figure 4:
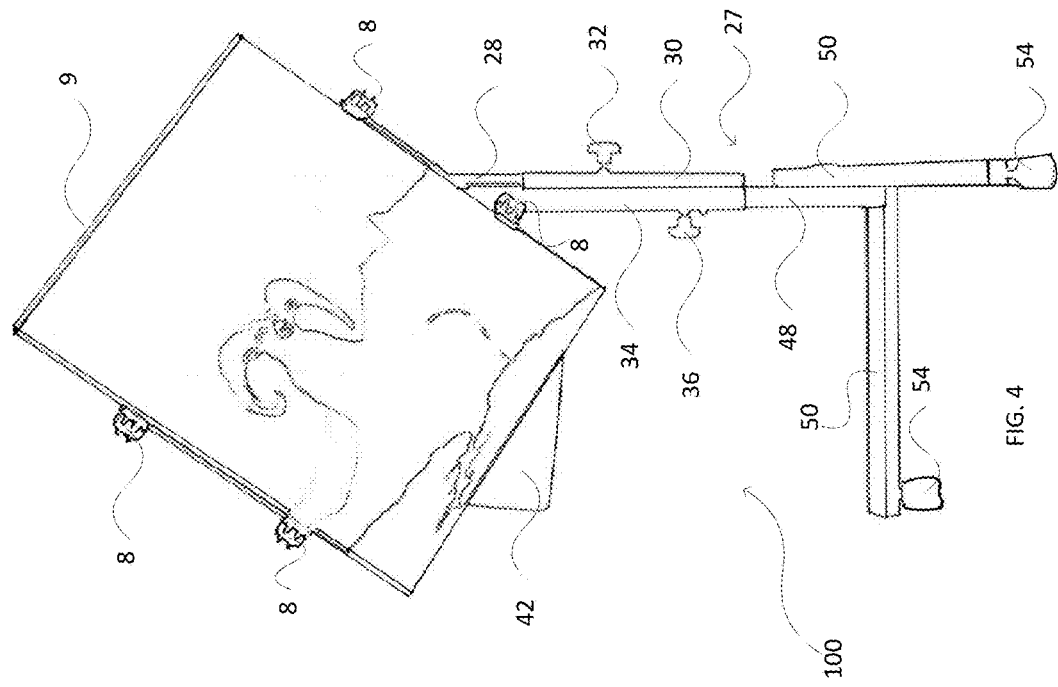
FIG. 4 shows a front-side perspective view of the rotation of the work platform. The work platform can be rotated in either direction and has a 360-degree range of rotation in both vertical and horizontal positions.

To assist in the understanding of the present disclosure the following list of components and associated numbering found in the drawings is provided herein:

| Table of Components | |
|---|---|
| Component | # |
| Work platform | 1 |
| Outer shell | 2 |
| Inner shell | 4 |
| Tension spring | 6 |
| Adjustable corner points | 8 |
| Work piece | 9 |
| Adjustment screws for corner points | 10 |
| Armature assembly | 11 |
| Mounting surface | 12 |
| Mounting ball and socket | 14 |
| Mounting ball and socket lever | 16 |
| Armature ball and socket | 18 |
| Armature ball and socket lever | 20 |
| Star knob | 22 |
| Upper armature | 23 |
| Lower armature | 24 |
| Star knob for lower armature | 26 |
| Vertical adjustment assembly | 27 |
| Upper vertical adjustable post | 28 |
| Vertical adjustable post sleeve | 30 |
| Star knob for the vertical adjustable post | 32 |
| Main adjustable post sleeve | 34 |
| Star knob for the main adjustable post sleeve | 36 |
| Utility tray support sleeve | 38 |
| Horizontal bar | 39 |
| Star knob for the utility tray support sleeve | 40 |
| Utility tray | 42 |
| Adjustment bracket | 44 |
| Star knob for the utility tray | 46 |
| T-base | 47 |
| Vertical post | 48 |
| Extension legs | 50 |
| Inner T-base | 52 |
| Wheels | 54 |
| Step peg | 56 |
| Securing pin | 57 |
| Locking pins | 58 |
| Easel | 100 |

DETAILED DESCRIPTION

With reference now to the drawings in which like numerals represent like elements throughout FIGS. 1-9 show various views of a multi-positional Easel 100. Referring now mainly to FIGS. 1 and 2, the Work platform 1 is comprised of an Outer shell 2, an Inner shell 4, a Tension spring 6, an Adjustable corner points 8, and an Adjustment screws 10 for the adjustable corner points 8. The Inner shell 4 can slide inside of the Outer shell 2. A Tension spring 6 is attached to the outer most sides of both the Outer shell 2 and the Inner shell 4. When the Inner shell 4 and the Outer shell 2 are expanded, the Tension spring 6 allows for various sized work pieces 9 to be used. Work piece 9 is held in place on the Work platform 1 by four Adjustable corner points 8. The Adjustable corner points 8 can also be adjusted to accommodate various thicknesses of work pieces by sliding the Adjustable corner points 8 in a direction perpendicular to the outer shell 2 and the inner shell 4 using the Adjustment screws 10 for the adjustable corner points 8.

Figure 7:
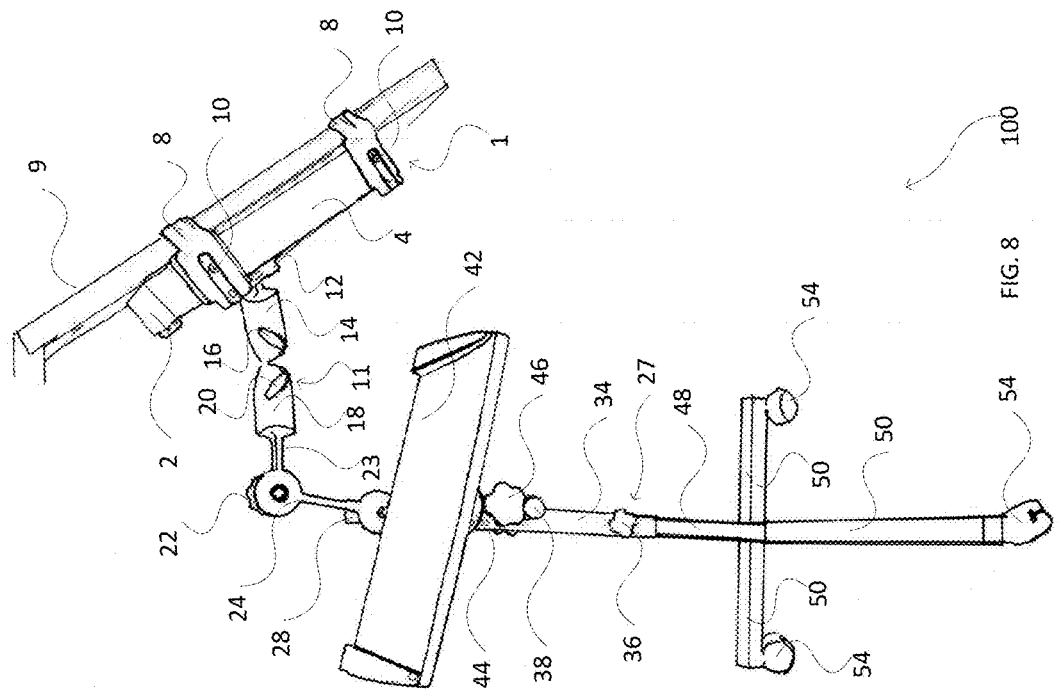
FIG. 7 shows a left-side perspective view of the multi-positional easel with the work platform and utility tray in horizontal positions.

An Armature assembly 11 consists of a Mounting surface 12 that attaches to the back of the Outer shell 2. A Mounting ball and socket 14, a Mounting ball and socket lever 16, an Armature ball and socket 18, an Armature ball and socket lever 20, and a Star knob 22 for an Upper armature 23, Lower armature 24, and Star knob for lower armature 26 are also components of Armature assembly 11. Mounting ball and socket 14 and Armature ball and socket 18 allow for a full 360-degree rotation of the Work platform 1. The Mounting ball and socket 14 allows for a vertical movement in the socket joint, enabling the Work platform 1 to be moved into a horizontal position, as shown in FIG. 7. Mounting ball and socket lever 16 can lock and loosen Work platform 1 into a desired position. Armature ball and socket 18 hold Mounting ball and socket 14 in a horizontal position, allowing the user free motion from side-to-side (horizontally). The Armature ball and socket lever 20 will lock the Work platform 1 into the desired position. The Star knob 22 for Upper armature 23 can lock and loosen the Armature assembly 11. Loosening the Star knob 22 for Upper armature 23 will allow for the mobility of the Work platform 1, while tightening the Star knob 22 for Upper armature 23 will lock the Work platform 1 into place once the desired rotation has been reached. The Lower armature 24 is located between Upper armature 23 and the Upper vertical adjustable post 28. The Star knob for lower armature 26 allows for the adjustability of the Armature assembly 11 into desired positions. When the Star knob for lower armature 26 is loosened, the Armature assembly 11 has the ability to be manipulated into the desired position. However, when the Star knob for lower armature 26 is tightened it locks the Armature assembly 11 into place.

Referring primarily to FIG. 2, Vertical adjustment assembly 27 is comprised of an Upper vertical adjustable post 28, a Vertical adjustable post sleeve 30, a Star knob for the vertical adjustable post 32, a Main adjustable post sleeve 34, a Horizontal bar 39 integrated into the Main adjustable post sleeve 34, a Star knob for the main adjustable post sleeve 36, a Utility tray support sleeve 38, a Star knob for the utility tray support sleeve 40, a Utility tray 42, an Adjustment bracket 44 for the Utility tray 42, and a Star knob for the utility tray 46, all of which attach to a Vertical post 48 of the T-base 47. Upper vertical adjustable post 28 slides vertically inside a Vertical adjustable post sleeve 30 with Star knob for the vertical adjustable post 32 locking and loosening Upper vertical adjustable post 28 into the desired height. Vertical adjustable post sleeve 30 is attached to the Main adjustable post sleeve 34 that slides vertically on Vertical post 48 of the T-base 47. Main adjustable post sleeve 34 can be locked and loosened into desired height positions by the use of a Star knob for the main adjustable post sleeve 36. The components which comprise Armature assembly 11, described above, along with Vertical adjustment assembly 27, described in this paragraph, together offer the ability for the user to be able to adjust Easel 100 to any desired height.

Figure 3:
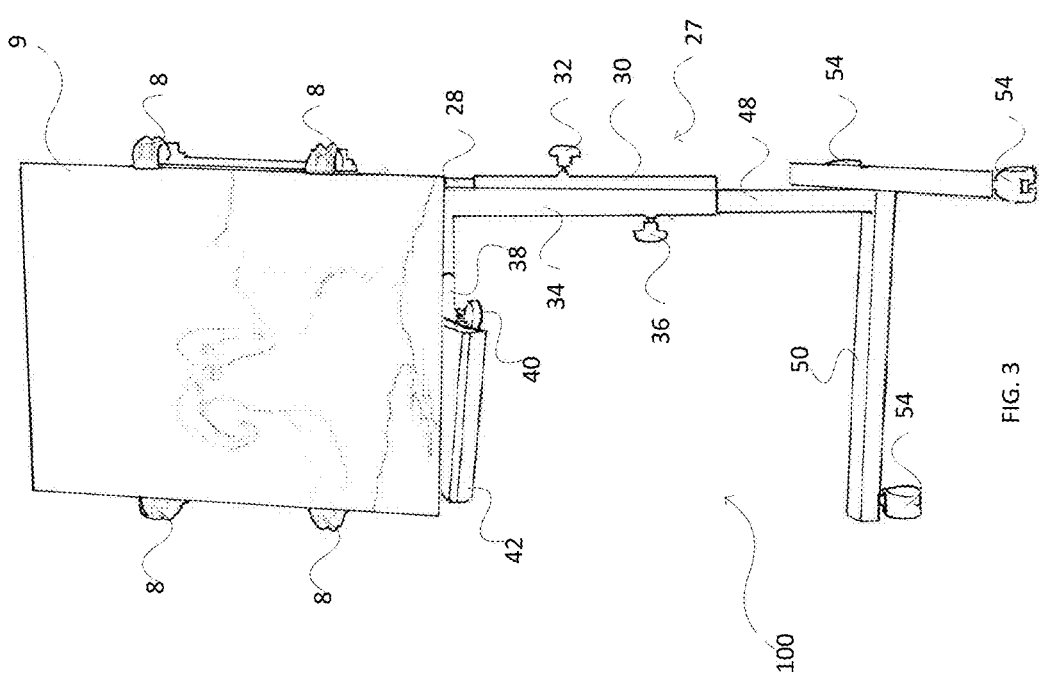
FIG. 3 shows a front-side perspective view of the multi-position easel.

Referring now primarily to FIGS. 2, 3, and 5, Easel 100 may be equipped with a Utility tray 42. Utility tray 42 is attached using a Utility tray support sleeve 38 which is a hollow cylinder with a slot. Utility tray support sleeve 38 slides over a Horizontal bar 39 integrated into the Main adjustable post sleeve 34. By sliding the Utility tray support sleeve 38 back and forth, the desired location of the Utility tray 42 can be reached and locked into place with Star knob for the utility tray support sleeve 40.

Figure 8:
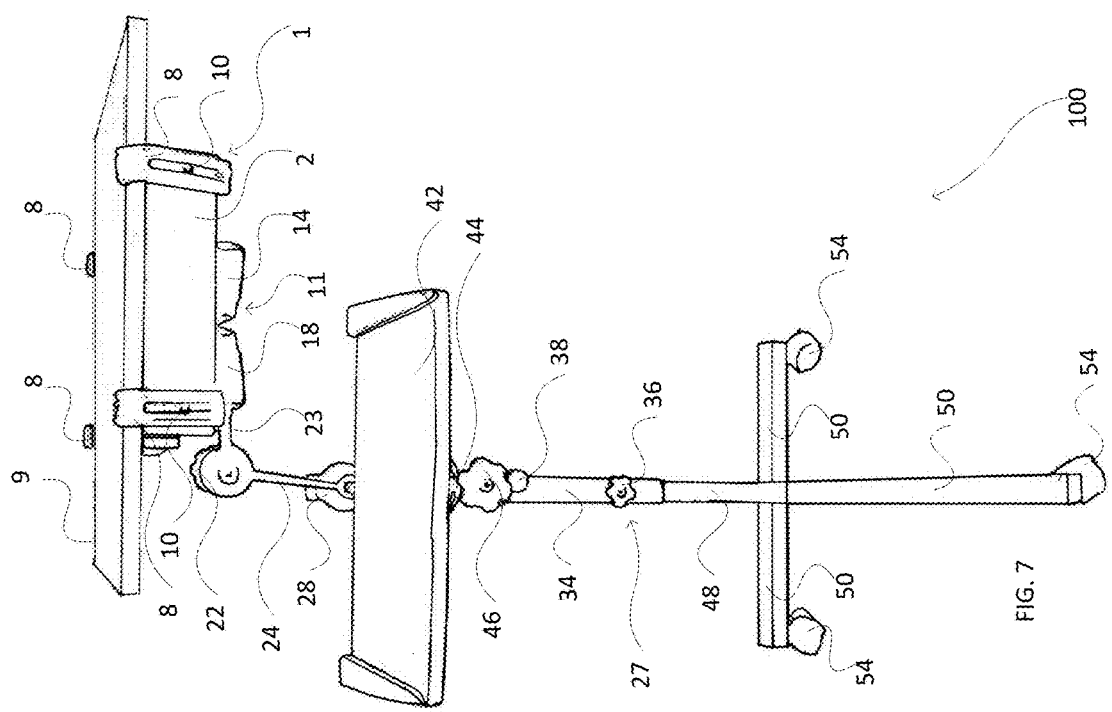
FIG. 8 shows a left-side perspective view of the multi-positional easel with the work platform and utility tray in tilted positions.
Figure 9:
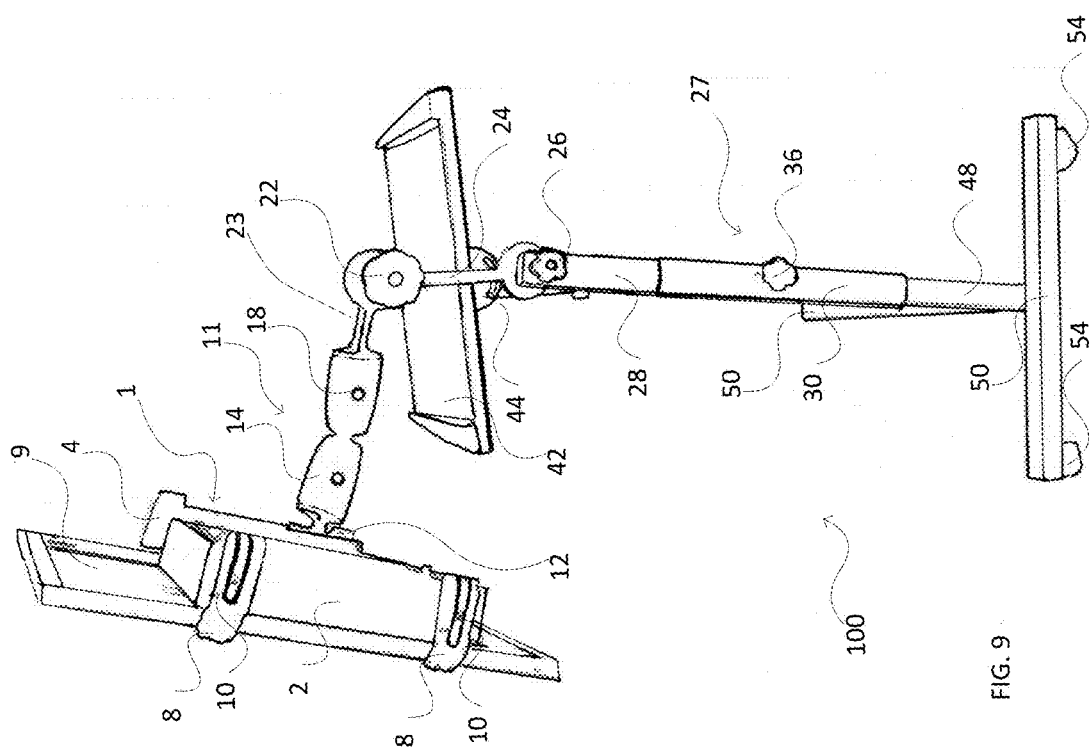
FIG. 9 shows a right-side perspective view of the multi-positional easel indicating the ball in socket that will allow the rotation of the work platform.

Referring now primarily to FIGS. 1, 5, 7, 8, and 9, Utility tray 42 can also be positioned in various positions from vertical to horizontal by Adjustment bracket 44 for utility tray 42. This allows for the vertical to horizontal movement of the Utility tray 42 and Star knob for the utility tray 46 can lock the location of Utility tray 42 on Adjustment bracket 44 for utility tray 42. Or, at the user's discretion, Utility tray 42 can be removed all together as shown in FIG. 5. The horizontal positioning of Utility tray 42 can be locked into place using Star knob for the utility tray 46 as shown in FIGS. 1, 7, and 8. Utility Try 46 can also be rotated 360-degrees about Horizontal bar 39 and locked into place with Star knob for the utility tray support sleeve 40.

The design of Easel 100 allows for various other apparatuses to be attached to the horizontal part of the Main adjustable post sleeve 34.

By using Armature assembly 11 mentioned above, and Vertical adjustment assembly 27 also previously mentioned, allows the user a wide range of desired positions, from a seated position on the floor as shown in FIG. 5, to a standing position as shown in FIGS. 1-4 and 7-9. FIG. 5 also shows that the multi-positional Easel 100 in a position which can be used while seated on the floor, or for an easy storage position which takes up less space.

FIG. 6 shows the T-base 47 of Easel 100 is comprised of a Vertical post 48 which attaches to the Inner T-base 52. Extension legs 50 slide in and out over the Inner T-base 52 and can be locked into a desired position with Locking pins 58 (depicted in the blow-up portion in FIG. 6). Adjusting the width and length of T-base 47 with Inner T-base 52 and Extension legs 50 allows for needed stability in various environments. Inner T-base 52 has evenly spaced holes for Locking pins 58 to lock Extension legs 50 into Inner T-base 52. T-base 47 of Easel 100 also has three adjustable Wheels 54. Wheels 54 can be lockable, and can be adjusted in height by the use of a Step peg 56 that ratchets up or down. The Wheels 54 can be raised or lowered using Step pegs 56 passing through Extension legs 50 and using securing pins 57 inserted into one of a plurality of holes located in the Step pegs 56, allowing for minor height adjustments when Easel 100 is positioned on uneven surfaces. The Wheels 54 allow for mobility of Easel 100 in any space with ease and can be easily locked into place to restrict unwanted movement.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. It will be understood by those skilled in the art that many changes in construction and widely differing embodiments and applications will suggest themselves without departing from the scope of the disclosed subject matter.

What is claimed is:

1. A multi-positional easel comprising:
   a T-base comprising:
      an inner T-base;
      a plurality of extension legs that each are extendible over the inner T-base to increase stability of the multi-positional easel;
      a vertical post extending from the inner T-base;
      a plurality of wheels that each are located at an end of each of the plurality of extension legs that can be adjusted up or down when the multi-positional easel is located on an uneven surface;
a work platform comprising:
an outer shell;
an inner shell slidably movable within the outer shell;
a plurality of adjustable corner points attached to the outer shell and to the inner shell;
a tension spring having a first end and a second end, the first end attached to an outer side of the outer shell, and the second end attached to an outer side of the inner shell;
a vertical adjustment assembly adjustably connected to the vertical post;
an armature assembly connected to the work platform and adjustably connected to the vertical adjustment assembly, the armature assembly comprising:
a mounting ball and socket attached to the outer shell,
an armature ball and socket adjustably connected to the mounting ball and socket
and adjustably connected to the vertical adjustment assembly;
the mounting ball and socket and the armature ball and socket allow for full 360-degree rotation of the work platform in any orientation and for orienting the work platform from vertical to horizontal positions, and the vertical adjustment assembly allows for vertical movement of the work platform.

2. The multi-positional easel according to claim 1 wherein the vertical adjustment assembly further comprises:
a work piece secured within by the plurality of adjustable corner points and the action of the tension spring on the outer shell and the inner shell;
a main adjustable post sleeve slidably movable vertically over the vertical post;
a horizontal bar integrated into the main adjustable post sleeve;
a utility tray support sleeve slidably movable over the horizontal bar;
an adjustment bracket attached to the utility tray support sleeve; and
a utility tray attached to the adjustment bracket;
wherein the utility tray can be positioned in various positions from vertical to horizontal and allow for full 360-degree rotation.

3. The multi-positional easel according to claim 2 wherein the vertical adjustment assembly further comprises:
a vertical adjustable post sleeve attached to the main adjustable post sleeve; and
an upper vertical adjustable post slidably movable inside the vertical adjustable post sleeve;
wherein the work platform can be raised or lowered vertically in height.

4. The multi-positional easel according to claim 3 wherein the armature assembly further comprises:
a lower armature adjustably connected to the upper vertical adjustable post;
an upper armature connected to the lower armature and connected to the armature ball and socket; and
a mounting surface attached to the mounting ball and socket and attached to the outer shell.

5. The multi-positional easel according to claim 4 further comprising:
a plurality of star knobs for locking and loosening at least one of the upper armature, the lower armature, the vertical adjustable post, the main adjustable post sleeve, the utility tray support sleeve, and the utility tray; and
a mounting ball and socket lever and an armature ball and socket lever for locking and loosening the mounting ball and socket and the armature ball and socket.

6. The multi-positional easel according to claim 1 further comprising:
a plurality of step pegs that each are attached to each of the plurality of wheels, the plurality of step pegs each passing through each of the plurality of extension leg; wherein the plurality of wheels can be adjusted up or down when the multi-positional easel is located on an uneven surface.

7. The multi-positional easel according to claim 1 further comprising:
a plurality of locking pins that each are located in each of the plurality of extension legs, the plurality of locking pins each are inserted into a one of a plurality of holes located in the plurality of extension legs to secure the plurality of extension legs in a desired position; and
a plurality of securing pins that each are inserted into a one of a plurality of holes located in the plurality of locking pins.

8. The multi-positional easel according to claim 1 further comprising:
a plurality of adjustment screws that each are located in each of the plurality of adjustable corner points;
wherein various thicknesses of the workpiece can be accommodated by adjusting the plurality of adjustable corner points and securing in place with the plurality of adjustment screws.

9. A multi-positional easel comprising:
a T-base;
a vertical adjustment assembly adjustably connected to the T-base, the vertical adjustment assembly further comprising:
a vertical post extending from the T-base;
a main adjustable post sleeve slidably movable vertically over the vertical post;
a horizontal bar integrated into the main adjustable post sleeve;
a utility tray support sleeve slidably movable over the horizontal bar;
an adjustment bracket attached to the utility tray support sleeve; and
a utility tray attached to the adjustment bracket;
wherein the utility tray can be positioned in various positions from vertical to horizontal and allow for full 360-degree rotation;
a work platform comprising:
an outer shell;
an inner shell slidably movable within the outer shell;
a plurality of adjustable corner points attached to the outer shell and to the inner shell;
a tension spring having a first end and a second end, the first end attached to an outer side of the outer shell, and the second end attached to an outer side of the inner shell;
an armature assembly connected to the work platform and adjustably connected to the vertical adjustment assembly, the armature assembly comprising:
a mounting ball and socket attached to the outer shell,
an armature ball and socket adjustably connected to the mounting ball and socket
and adjustably connected to the vertical adjustment assembly;
the mounting ball and socket and the armature ball and socket allow for full 360-degree rotation of the work platform in any orientation and for orienting the work platform from vertical to horizontal positions, and the vertical adjustment assembly allows for vertical movement of the work platform.

10. The multi-positional easel according to claim 9 wherein the vertical adjustment assembly further comprises:
   a work piece secured within by the plurality of adjustable corner points and the action of the tension spring on the outer shell and the inner shell;
   a vertical adjustable post sleeve attached to the main adjustable post sleeve; and
   an upper vertical adjustable post slidably movable inside the vertical adjustable post sleeve;
   wherein the work platform can be raised or lowered vertically in height.

11. The multi-positional easel according to claim 10 wherein the armature assembly further comprises:
   a lower armature adjustably connected to the upper vertical adjustable post;
   an upper armature connected to the lower armature and connected to the armature ball and socket; and
   a mounting surface attached to the mounting ball and socket and attached to the outer shell.

12. The multi-positional easel according to claim 11 further comprising:
   a plurality of star knobs for locking and loosening at least one of the upper armature, the lower armature, the vertical adjustable post, the main adjustable post sleeve, the utility tray support sleeve, and the utility tray; and
   a mounting ball and socket lever and an armature ball and socket lever for locking and loosening the mounting ball and socket and the armature ball and socket.

13. The multi-positional easel according to claim 9 wherein the T-base further comprises:
   an inner T-base;
   a plurality of extension legs that each are extendible over the inner T-base to increase stability of the multi-positional easel;
   a plurality of wheels that each are located at an end of each of the plurality of extension legs;
   a plurality of step pegs that each are attached to each of the plurality of wheels, the plurality of step pegs each passing through each of the plurality of extension legs; and
   a plurality of securing pins that each are inserted into a one of a plurality of holes located in the plurality of step pegs;
   the plurality of wheels can be adjusted up or down when the multi-positional easel is located on an uneven surface.

14. The multi-positional easel according to claim 13 further comprising:
   a plurality of locking pins that each are located in each of the plurality of extension legs, the plurality of locking pins each are inserted into a one of a plurality of holes located in the plurality of extension legs to secure the plurality of extension legs in a desired position; and
   a plurality of securing pins that each are inserted into a one of a plurality of holes located in the plurality of locking pins.

15. The multi-positional easel according to claim 9 further comprising:
   a plurality of adjustment screws that each are located in each of the plurality of adjustable corner points;
   wherein various thicknesses of the workpiece can be accommodated by adjusting the plurality of adjustable corner points and securing in place with the plurality of adjustment screws.

\* \* \* \* \*